(12) United States Patent
Han et al.

(10) Patent No.: US 8,537,950 B2
(45) Date of Patent: Sep. 17, 2013

(54) ARCHITECTURE TO REMOVE A BIMODAL DYNAMIC DC OFFSET IN DIRECT CONVERSION RECEIVER

(75) Inventors: Kwangseok Han, Cambridge (GB); Marco Bruno, Cambridge (GB); Stuart Aitken, Cambridge (GB); Steve Jones, Milton Keynes (GB); Simon Chang, Cambridge (GB); James Digby Yarlet Collier, Suffolk (GB)

(73) Assignee: Cambridge Silicon Radio Limited, Cambridge (GB)

( * ) Notice: Subject to any disclaimer, the term of this patent is extended or adjusted under 35 U.S.C. 154(b) by 411 days.

(21) Appl. No.: 12/851,772

(22) Filed: Aug. 6, 2010

(65) Prior Publication Data

US 2011/0188555 A1   Aug. 4, 2011

(30) Foreign Application Priority Data

Aug. 25, 2009 (GB) .................................. 0914844.6

(51) Int. Cl.
  *H04L 7/00* (2006.01)
  *H04L 25/00* (2006.01)
  *H04L 25/40* (2006.01)
(52) U.S. Cl.
  USPC .......................................... 375/371; 327/307
(58) Field of Classification Search
  USPC .................... 375/319, 371; 327/307
  See application file for complete search history.

(56) References Cited

U.S. PATENT DOCUMENTS

| | | | | |
|---|---|---|---|---|
| 5,293,408 A * | 3/1994 | Takahashi et al. | ............ | 375/349 |
| 6,009,126 A * | 12/1999 | Van Bezooijen | ............... | 375/319 |
| 6,700,514 B2 * | 3/2004 | Soltanian et al. | ............. | 341/118 |
| 8,010,064 B2 * | 8/2011 | Kim et al. | .................. | 455/115.2 |
| 8,018,990 B2 * | 9/2011 | Lee et al. | ....................... | 375/226 |
| 2003/0109241 A1 | 6/2003 | Kim | | |
| 2003/0151443 A1 * | 8/2003 | Kondo et al. | .................. | 327/307 |
| 2006/0083335 A1 * | 4/2006 | Seendripu et al. | ............. | 375/332 |
| 2006/0148441 A1 * | 7/2006 | Zinser | ............................. | 455/336 |
| 2009/0131006 A1 * | 5/2009 | Wu | ............................... | 455/257 |
| 2009/0215417 A1 | 8/2009 | Fortuin | | |
| 2011/0037506 A1 * | 2/2011 | Kalakota et al. | .............. | 327/307 |

OTHER PUBLICATIONS

German Patent Office action dated Jun. 16, 2011 (English translation).

* cited by examiner

*Primary Examiner* — Jean B Corrielus
(74) *Attorney, Agent, or Firm* — Novak Druce Connolly Bove + Quigg LLP; Vincent M DeLuca (57) ABSTRACT

Apparatus for controlling the generation of a DC signal at the output of a mixer, so that the DC signal is predictable, enabling a static offset compensation voltage to offset the DC signal. The apparatus comprises a mixer configured to receive a first and a second input signal, the mixer being such as to generate a first DC signal at the output of the mixer when the first and second input signals have the same frequency and a first relative phase, a phase detector for determining the relative phase of the first and second signals, and a phase modifier configured to modify the phase of the second signal relative to the first signal in dependence on the determination of the relative phase between the first and second signals such that the resulting DC signal at the output of the mixer is the first DC signal.

24 Claims, 9 Drawing Sheets

ARCHITECTURE TO REMOVE A BIMODAL DYNAMIC DC OFFSET IN DIRECT CONVERSION RECEIVER

The present invention relates to methods of reducing DC offset problems usually associated with direct conversion receiver architectures.

More specifically, an aspect of the invention relates to eliminating dynamic DC offset generated by self-mixing of a coupled local oscillator (LO) signal to a low noise amplifier (LNA) input.

BACKGROUND OF THE INVENTION

A direct-conversion receiver (DCR) architecture is a radio receiver architecture that mixes a received signal with a local oscillator signal whose frequency is equal to the carrier frequency with which the desired signal was transmitted. The resulting mixed signal is then filtered using a low pass filter to obtain the desired signal and to remove the remaining unwanted signals originally residing on different carrier frequencies.

Signal frequency drift of the local oscillator (LO) is prevented by means of a phase lock loop (PLL).

Offset Problem

One of the problems with direct conversion receiver architectures is a DC offset occurring in the mixed signal. A cause of the DC offset can be local oscillator energy that leaks back to the antenna via electromagnetic coupling and then re-enters the mixer. When this leaked signal component is effectively mixed with itself, a component of the resulting signal is a 0 Hz DC signal. The DC offset can sometimes be strong enough to disrupt the baseband amplifiers of the receiver and disrupt the signal demodulation.

DC offset in direct-conversion receivers can have static and/or dynamic components.

Static Offset

Static offset is mainly generated through the above process and from device mismatch. This is where components of the system do not exactly match the ideal values of the system and DC offsets occur in the processed signal. However, if the DC offset is static and does not change over time, it can be easily minimized by adding an offset adjustment circuit.

Figure 1:
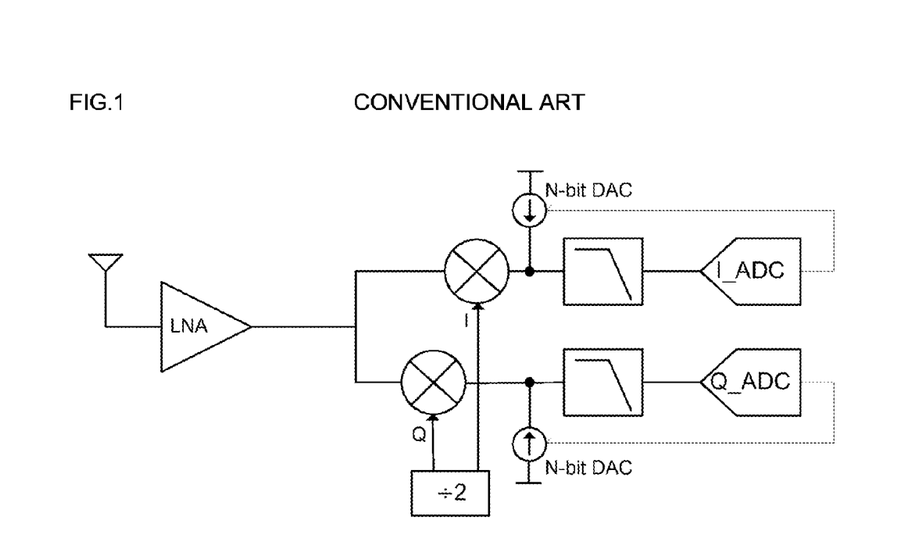
FIG. 1 shows conventional DC offset calibration in a typical direct conversion receiver.

One method of adding an offset adjustment circuit is by means of a current source controlled using an n-bit digital-to-analog converter (DAC). Such a system is shown in FIG. 1. By sending the DAC different control codes, the amount of offset current can be adjusted. In the system shown in FIG. 1, the optimum code for the DAC is determined by an analog-to-digital converter (ADC).

The calibration of the offset signal is done under firmware control; there is no direct link between the ADC & offset DAC. A look-up-table based approach is used to determine the best control codes to send to the DAC given the input from the ADC. Since this calibration requires that all of the receive chain is switched-on and it takes such a long time to perform the calibration, it would consume a lot of power to run this in real-time. Therefore, the calibration is usually done once per chip while the temperature is kept within a predetermined range.

Dynamic Offset

Figure 2:
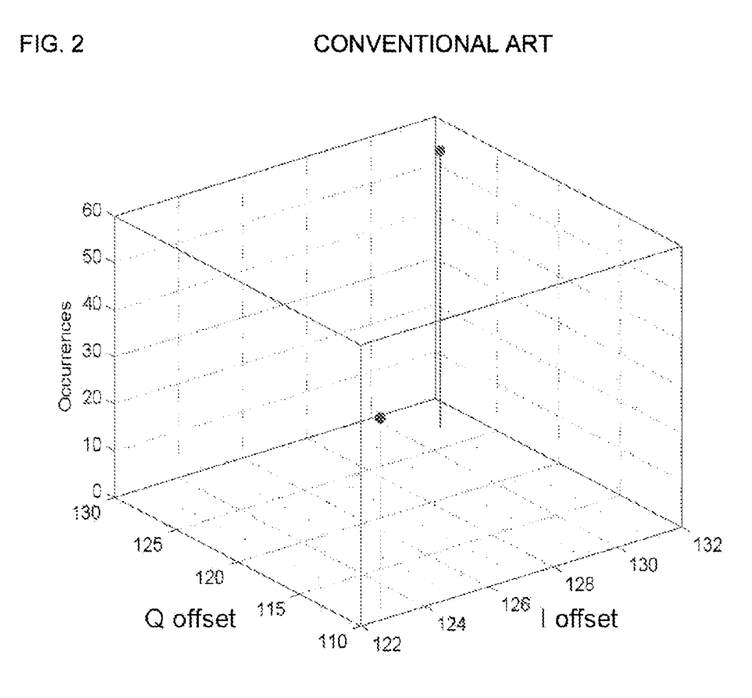
FIG. 2 shows the bimodality of DC offsets experienced in the system of FIG. 1.

Typically, the above technique is effective. However, in certain architectures, the DC offset randomly flips between two distinct values—an effect called "bimodal DC offset". This is illustrated in FIG. 2, which shows the measured optimum DAC codes in a single fabricated integrated chip while the receive chain is turned on and off repeatedly. The flip will only occur when the receiver or PLL starts. During the operation, the offset will not change.

When a receiver architecture exhibits bimodal DC offset, the technique of using a fixed calibrated DC offset fails—the system will calibrate to one of the offsets and will be unable to cope with the other one. The net result is a collapse in receiver sensitivity. A more detailed explanation of the causes of bimodal DC offset follows.

Cause of Bimodal Dynamic Offset

Figure 3A:
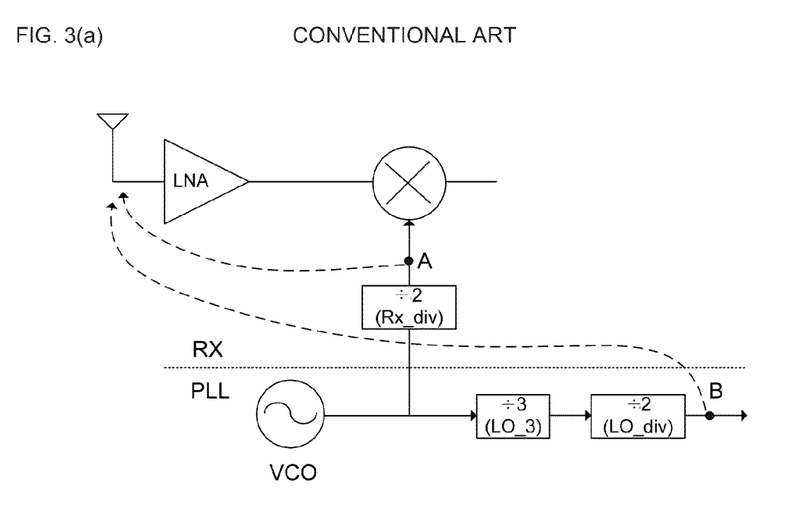
FIG. 3(a) shows feedback signals present in the receiver and PLL.

FIG. 3(a) shows parts of a typical receiver and PLL. Only the I-channel is shown for simplicity.

Figure 3B:
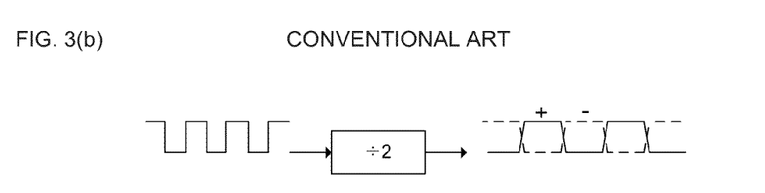
FIG. 3(b) shows the output states of the high frequency divider with respect to the input as shown.

The local oscillator signal frequency generated by the PLL is divided by 2 by Rx_div to provide signal A which is used for mixing with the received signal from the antenna. The local oscillator signal frequency is also divided by 3 using LO_3 and then by 2 using LO_div. In this example, the output signal from LO_div will therefore be the $6^{th}$ sub-harmonic of the local oscillator signal frequency generated by the PLL, or the $3^{rd}$ sub-harmonic of signal A. Therefore, the $3^{rd}$ harmonic of the output of LO_div is the same frequency as the fundamental tone of signal A. This $3^{rd}$ harmonic of the output of LO_div is called signal B. Although the frequencies of signals A and B are the same, the phase of signal B can be different to the phase of signal A. This is because the output of the high frequency dividers can have two states with respect to the input. An example of this is shown FIG. 3b. Depending on initial input conditions, the divided signal may start high or start low. Although one of two states can be selected with specific initial and input conditions, it is very difficult to select one of two states directly due to self-oscillation in high frequency dividers. Therefore, signals A and B can have arbitrary states relative to each other whenever they are turned on.

Signals A and B can be coupled to the LNA input by means of parasitic paths, and for the reason described above, this can result in a DC offset forming at the output of the mixer. In this case, the interference from signals A and B at the input to the LNA will result in a dynamic DC offset at the output of the mixer, as the DC offset is dependent on the relative phase of signals A and B.

There are four possible combinations for the interference at the LNA input, dependent on the state of signals A and B. These can be conceptually expressed as (+A+B), (+A−B), (−A+B), (−A−B). Once this interference is mixed with A by the mixer, the corresponding DC offset will be either:

$(+A+B)\cdot(+A)$, $(+A-B)\cdot(+A)$, $(-A+B)\cdot(-A)=(+A-B)\cdot(+A)$, $(-A-B)\cdot(-A)=(+A+B)\cdot(+A)$ Consequently, the DC offset can hold one of two values: $(+A+B)\cdot(+A)$ or $(+A-B)\cdot(+A)$. This leads to a bimodal DC offset.

What is needed is a method of compensating for bimodal DC offset in order to improve receiver sensitivity.

SUMMARY OF THE INVENTION

According to a first aspect of the invention, there is provided an apparatus for controlling the generation of a DC signal at the output of a mixer, the apparatus comprising: a mixer configured to receive a first and a second input signal, the mixer being such as to generate a first DC signal at the output of the mixer when the first and second input signals have the same frequency and a first relative phase, a phase detector for determining the relative phase of the first and second signals, a phase modifier configured to modify the phase of the second signal relative to the first signal in dependence on the determination of the relative phase between the first and second signals such that the resulting DC signal at the output of the mixer is the first DC signal.

According to a second aspect of the invention, there is provided a method of controlling the generation of a DC signal at the output of a mixer, the mixer being configured to receive a first and a second input signal, the mixer being such as to generate a first DC signal at the output of the mixer when the first and second input signals have the same frequency and a first relative phase, the method comprising the steps of: determining the relative phase of the first and second input signals to the mixer, modifying the phase of the second signal relative to the first signal in dependence on the determination made in the determination step such that the resulting DC signal at the output of the mixer is the first DC signal.

According to a third aspect of the invention, there is provided an apparatus for controlling compensating of a DC signal at the output of a mixer, the apparatus comprising: a mixer configured to receive a first and a second input signal, the mixer being such as to generate a first DC signal at the output of the mixer when the first and second input signals have the same frequency and a first relative phase, a phase detector for determining the relative phase of the first and second input signals, and a voltage compensating means configured to generate a second DC signal in dependence on the relative phase of the first and second input signals, such that the generated second DC signal compensates the first DC signal at the output of the mixer.

According to a fourth aspect of the invention, there is provided a method of controlling compensating of a DC signal at the output of a mixer, the mixer being configured to receive a first and a second input signal, the mixer being such as to generate a first DC signal at the output of the mixer when the first and second input signals have the same frequency and a first relative phase, the method comprising the steps of: determining the relative phase of the first and second input signals to the mixer, and generating a second DC signal in dependence on the relative phase of the first and second input signals, such that the generated second DC signal compensates the first DC signal at the output of the mixer.

BRIEF DESCRIPTION OF THE DRAWINGS

Aspects of the present invention will now be described by way of example with reference to the accompanying drawings, wherein.

DETAILED DESCRIPTION OF THE INVENTION

Receiver Section

Figure 4:
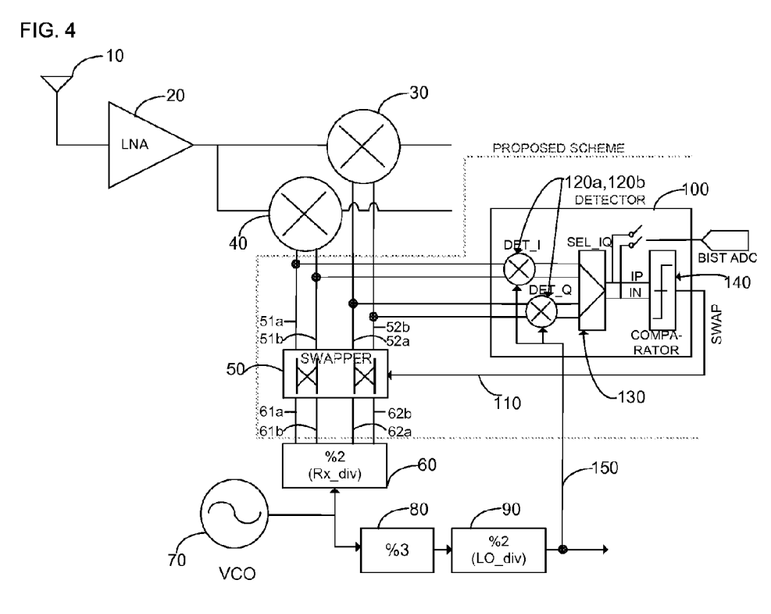
FIG. 4 shows the proposed auxiliary scheme to remove the bimodality.

An embodiment of the invention is shown in FIG. 4. Antenna 10 receives the radio signal and passes it to low noise amplifier (LNA) 20, which amplifies the signal for processing by the rest of the system. FIG. 4 shows the split of the system into the I and Q components for individual processing and mixing. Mixer 40 is used to mix the I component of the received signal whereas mixer 30 is used to mix the Q component.

Local Oscillator

Voltage controlled oscillator (VCO) 70 generates a local oscillator signal having a first frequency. The local oscillator signal is then divided by divider Rx_div 60. At the same time, the local oscillator signal is also divided by divider 80, before being divided again by LO_div 90. In this embodiment of the invention, both Rx_div and LO_div divide the frequency of the local oscillator signal by 2, resulting in a signal at the output having an oscillation at half the frequency of the signal at the input of the divider. Divider 80 is a Divide-by-3 divider. Therefore, as in the example of FIG. 3(a), in this embodiment, the output signal from LO_div will be the 6th sub-harmonic of the local oscillator signal frequency generated by the PLL, or the 3rd sub-harmonic of the output of Rx_div. The dividing values for divider 80, Rx_div 60 and LO_div 90 could be any values suitable for implementation of a direct-conversion receiver or similar architecture.

Detection/Swap

As shown in FIG. 4, divider Rx_div 60 has four output lines, 61a, 61b, 62a and 62b for I/Q down-conversion, leading to swapper 50. For differential operation 61a and 61b are positive and negative in-phase LO signal, also 62a and 62b are positive and negative quadrature-phase LO signal.

Figure 5:
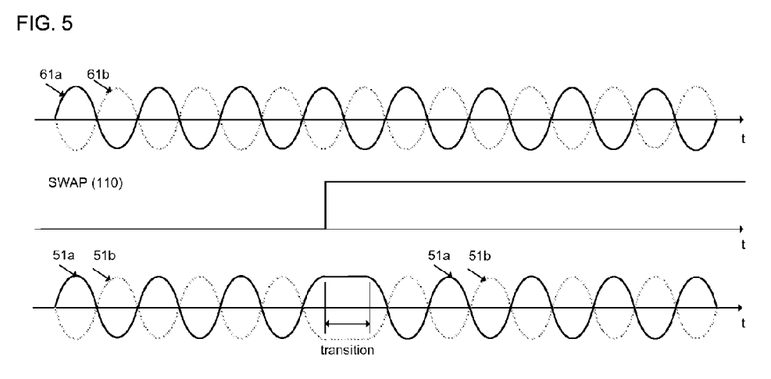
FIG. 5 shows the swapper operation with digital control input.

Swapper 50 has four output lines; 51a, 51b, 52a and 52b, leading to mixer 40 and mixer 30, respectively as shown in FIG. 4. Depending on the digital control signal 110, the swapper either connects lines 61a, 61b, 62a, 62b to 51a, 51b, 52a, 52b respectively, or it connects 61a, 61b, 62a, 62b to 51b, 51a, 52b, 52a respectively. To keep the I and Q relationship, polarity should change in a same way between I and Q in the swapper 50. Therefore, the swapper 50 changes the polarity of the signal reaching the mixers according to the digital input control signal received by using a switch network to change the routing for signal from Rx_div. An example of the output of lines 51a and 51b of swapper with respect to the input of lines 61a, 61b and swap line 110 is illustrated in FIG. 5. A transition period of half a period is required for the phases of the signal at outputs 51a and 51b to be reversed. In one aspect of the invention, the swapper is implemented with complementary transmission gates for large swing.

The outputs of swapper 50 are also connected to Gilbert cell mixers DET_I (120a) and DET_Q (120b). DET_I (120a) and DET_Q (120b) are both connected by line 150 to the output of LO_div such that the outputs of swapper 50 are mixed by the signal at line 150. In this embodiment, the $3^{rd}$ harmonic of the signal at line 150 is the same frequency as the outputs of swapper 50. When the outputs of Rx_div and LO_div are multiplied, a DC signal is generated at the output of each of DET_I (120a) and DET_Q (120b). Note that there is no need for a narrow pass filter to allow the third harmonic of the output of LO_div to DET_I and DET_Q, as only the third harmonic results in DC offset. All other harmonics of LO_div mixing with RF_div result in a non-zero frequency, which is filtered out by low-pass filtering in DET_I and DET_Q.

Figure 6:
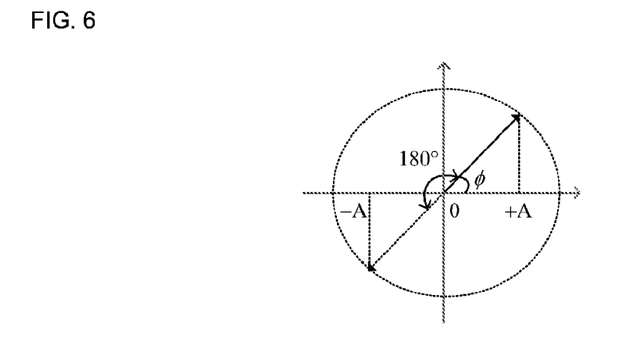
FIG. 6 shows the operation for the Gilbert cell inside the detector.

FIG. 6 shows the operation for each of the Gilbert cell mixers DET_I (120a) and DET_Q (120b) inside the detector. φ is a phase difference between the outputs of Rx_div and LO_div. The Gilbert cells output DC voltages corresponding to a quadrature representation (I and Q) of φ and both will invert the voltage at φ+180, where φ+180 represents the flipping case of LO_div.

In one aspect of the invention, the outputs of the Gilbert cell mixers are fed into selector SEL_IQ 130 which is used to select between the I and Q DC voltages. Since φ usually changes across chips due to process and temperature variability, there is a possibility that one of the Gilbert cell outputs (I or Q) will be close to null. One way to avoid this nulling effect is to accurately measure both the I and Q outputs during a calibration stage and the component with the largest absolute value can then be connected to the comparator using selector 130. In one aspect, this calibration process, which selects between I and Q outputs with help of a built-in-self-test (BIST) ADC as shown in FIG. 4, need only be run occasionally.

The output of the selector is then passed into comparator 140 which generates a digital selection signal 110 for controlling swapper 50 to synchronize the polarity of the signal reaching mixers with that of LO_div.

Figure 7:
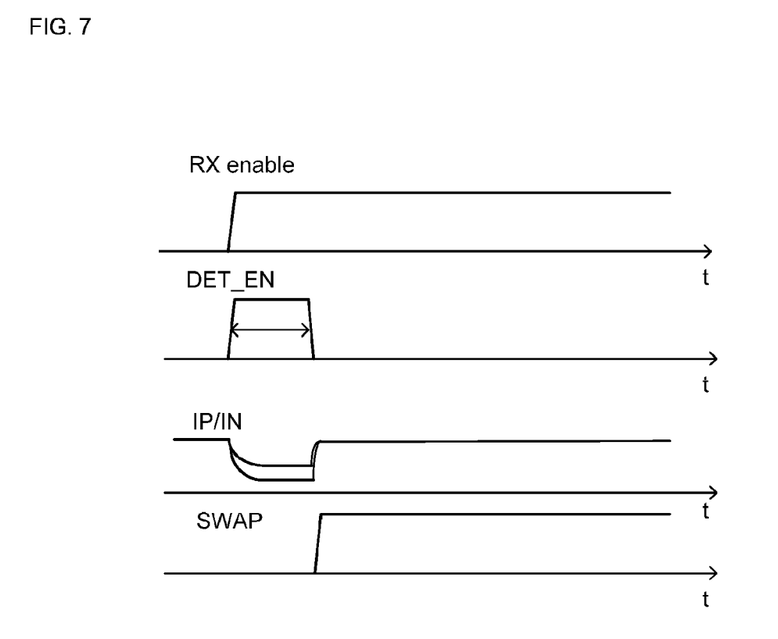
FIG. 7 shows a timing diagram for the polarity detection and swapping.

The selection between the I- and Q-Gilbert cells is usually performed only once. The swapping procedure to change the polarity of signal reaching mixers may be carried out every time the receiving apparatus is switched on/enabled. In FIG. 7, DET_EN is used to turn on I- and Q-Gilbert cell and a comparator inside the detector. DET_EN may have a short duration of about 500 nS. Comparator 140 will sample the input at the falling edge of DET_EN and hold it.

Operation

In a preferred aspect of the invention, the apparatus in FIG. 4 is switched on and a signal having a first frequency is generated by the VCO. Divider Rx_div 60 receives the VCO signal and divides the input signal to a signal having a frequency of half the first frequency, which is signal A.

Digital output signal 110 is forced to be low in an initial state. Swapper 50 selects the positive polarity if the digital input 110 is low and selects the inverted polarity if the input 110 is high, so the positive polarity is initially selected. Therefore, initially swapper 50 passes outputs from Rx_div 60 into mixers 40 and 30, and Gilbert mixers DET_I 120a and DET_Q 120b such that the positive polarity is taken. In the meantime, the VCO signal is passed through divider 80 and divider LO_div 90, resulting in a signal having a frequency of a $\frac{1}{6}^{th}$ of the first frequency, signal B. The resulting signal is connected to inputs of mixers DET_I 120a and DET_Q 120b via line 150. Mixers DET_I 120a and DET_Q 120b each produce a DC output, dependent on the respective I and Q values of their input signals. One of outputs from DET_I 120a and DET_Q 120b is selected by selector 130 according to which output has the largest magnitude. If the selected DC output is negative, the comparator generates a low controlling signal to swapper 50, which forces the swapper not to change the resolved polarity because the polarity is same as the initial polarity. If the resulting DC output is positive, the comparator generates a high controlling signal to swapper 50, which forces the swapper to change the polarity because the resolved polarity is different to the initial polarity.

In the following example

If the starting conditions result in a relatively positively phased A and B (+A and +B or −A and −B), the highest offset voltage at the output of the selector might be 1 volt.

If the starting conditions relatively negatively phased A and B (+A and −B, or −A and +B), the highest offset voltage at the output of the selector might be −1 volts.

The apparatus may be configured to compensate for an offset of +1 volts by means of a static compensation (as described in the background section). Therefore, according to an aspect of the present invention, the comparator maybe configured to swap the polarity of signal reaching mixers if the highest offset voltage at the output of the selector is −1 volt, such that the other offset voltage of +1 volts is achieved, which is correctly compensated for. If the correct offset of +1 volts is already present at the comparator, a suitable control signal is sent to the swapper, maintaining the orientation of the lines passed through the swapper. This arrangement allows the phase difference between the signal after the swapper and the signal B to be always equal, regardless of the starting conditions of dividers 50, 80, and 90. This ensures that the offset resulting at the output of mixers 30 and 40 is always the same and easily compensated for. It effectively transforms the offset experienced at the output of mixers 30 and 40 from a dynamic offset to a static offset. Furthermore, the swapper and detector components can be operated with very small current, e.g. up to 300 μA, and implemented in a small area of silicon.

Further Alternatives

Figure 8:
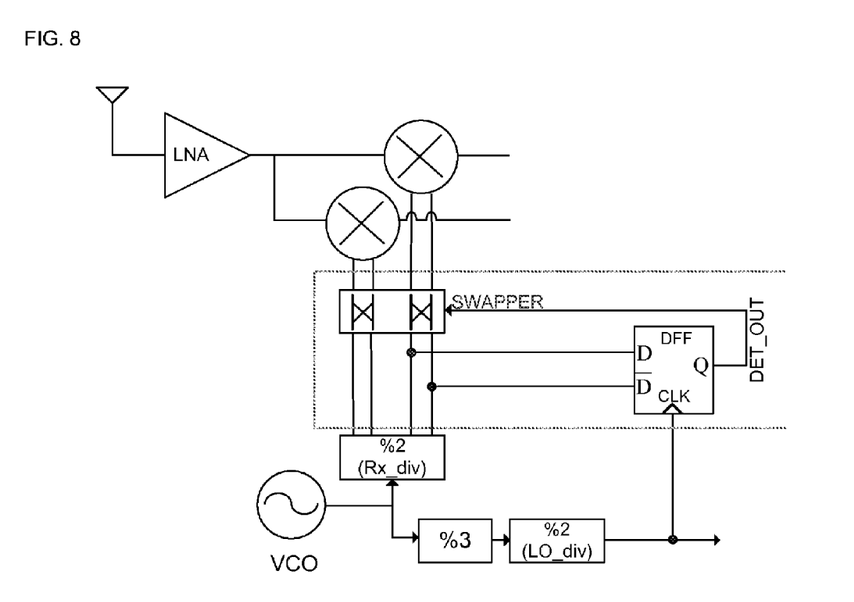
FIG. 8 shows an aspect of the invention wherein the phase is detected by latching the output of the receive divider using a D-flipflop clocked by the divided LO signal.
Figure 9:
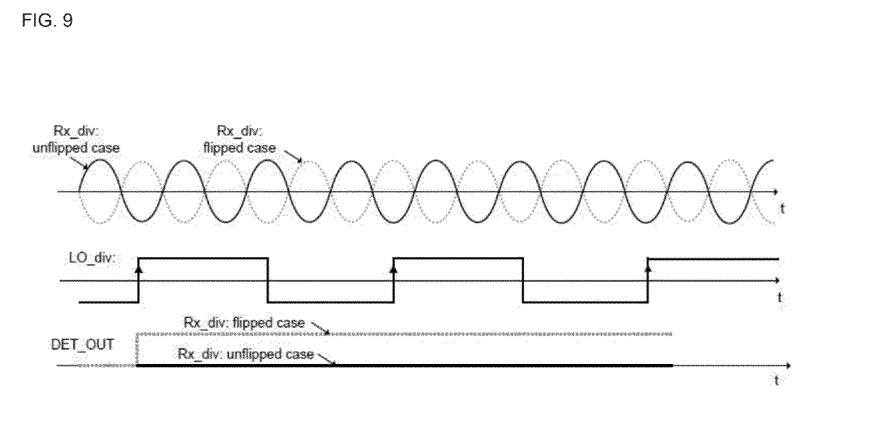
FIG. 9 shows the resulting waveforms of the phase detection aspect shown in FIG. 8.

FIGS. 8 and 9 show an alternative aspect of the invention, wherein the phase is detected by latching the output of the receive divider using a D-flipflop clocked by the divided LO signal. FIG. 8 shows the logic used to achieve this implementation, whereas FIG. 9 shows the resulting waveforms at Rx_div, LO_div, and DET_OUT. This implementation has the advantage of being simpler than using Gilbert cell mixers and does not require a calibration stage, unlike the previous embodiments.

Figure 10:
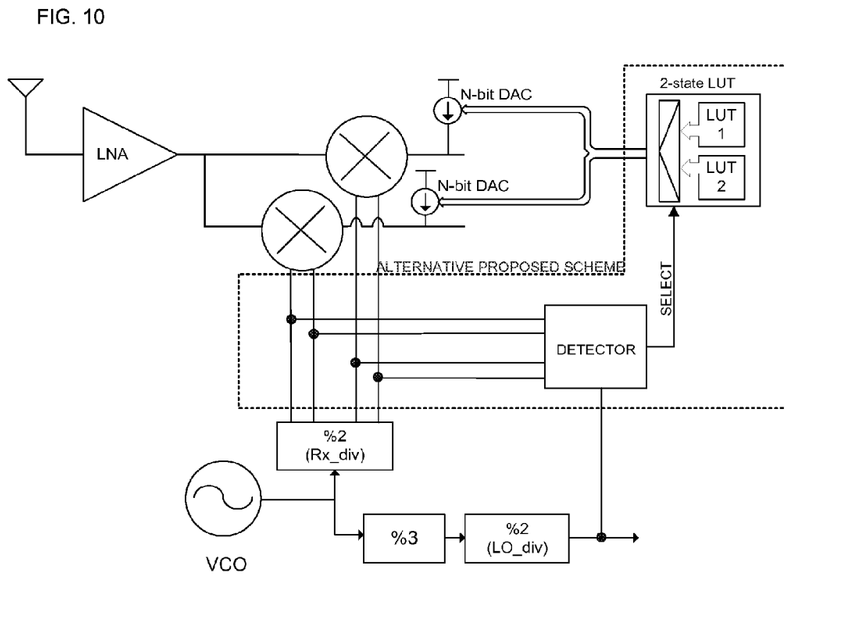
FIG. 10 shows an aspect of the invention wherein a lookup table is used to store two DC offset values.

In another alternative aspect of the invention shown in FIG. 10, two DC offset cancellation values are separately stored in a lookup table (LUT) for use in the N-bit DACs. The phase detector as set out in the primary implementation may still be used, but the output of detector would be used with a digital multiplexor to select which of two DC offsets to use to compensate the DC signal at the output of the mixers. In one embodiment, LUT1 stores a first DC offset cancellation value and LUT2 stores a second DC offset cancellation value. When the output of DETECTOR (the SELECT line) is high, the value stored in LUT 1 is sent to the two N-bit DACs, and each generates a corresponding first DC voltage at the output, which compensates the detected DC offset generated by the mixers. When SELECT is low, a second DC voltage is generated at the output of the DACs, which compensates the second detected DC offset generated by the mixers. This aspect has the advantage of not requiring matched transmission gates, i.e. swapper 50 in FIG. 4.

Figure 11:
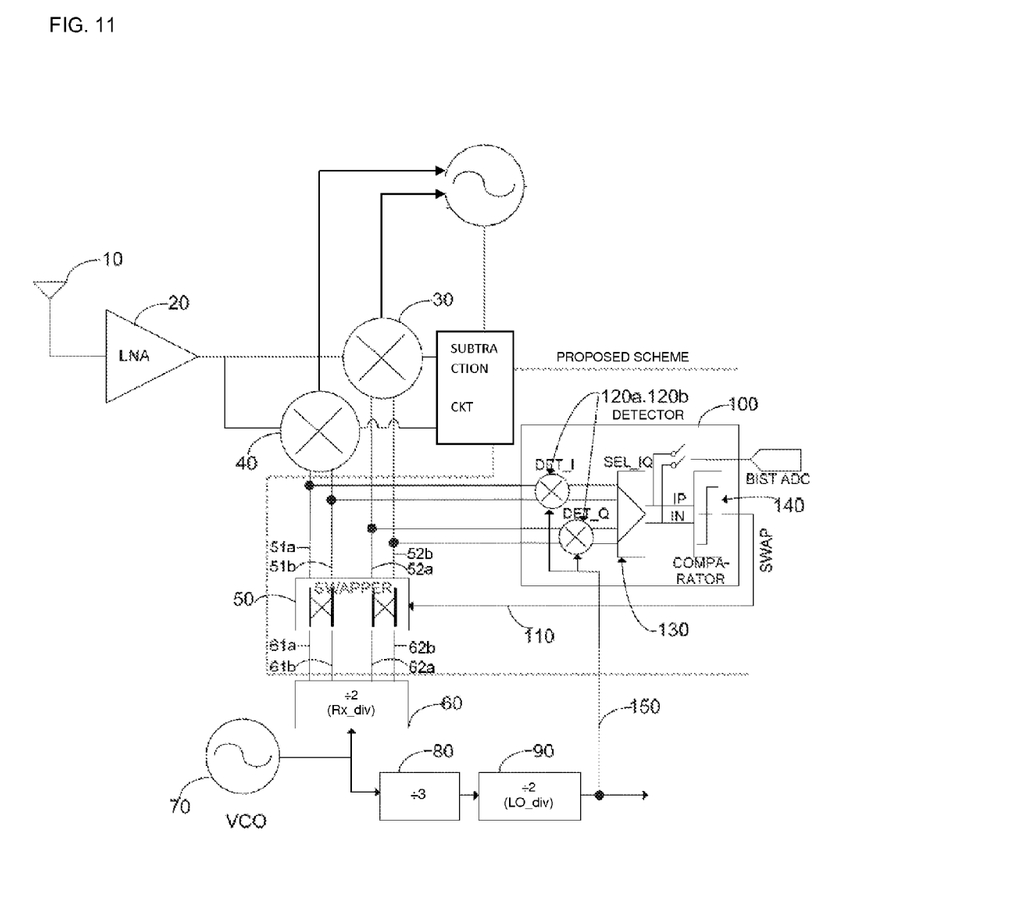
FIG. 11 shows the proposed auxiliary scheme to remove the bimodality including a subtraction circuit and a voltage source at the output of the mixers.
Figure 12:
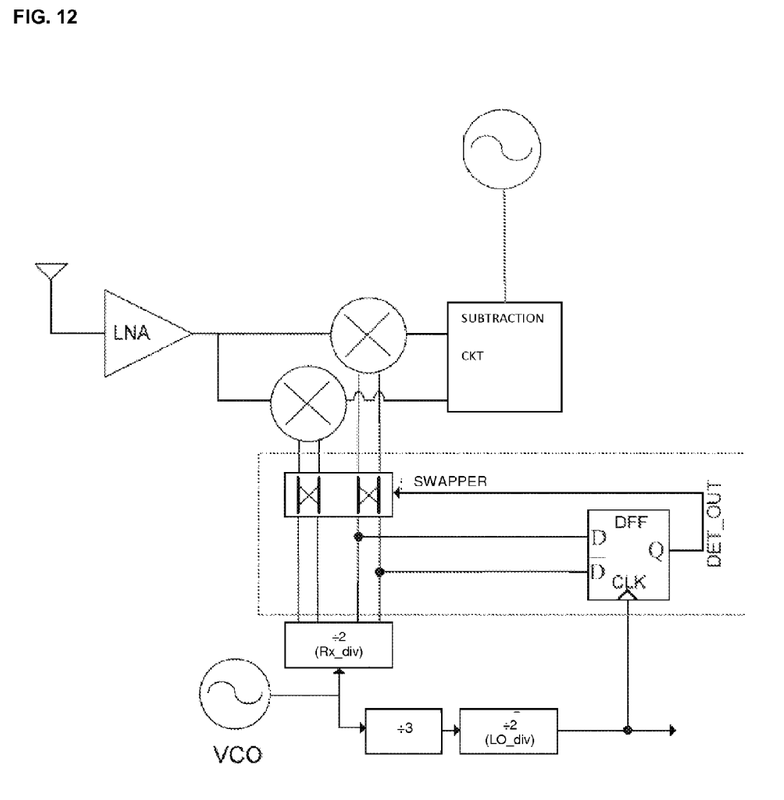
FIG. 12 shows an aspect of the invention wherein the phase is detected by latching the output of the receive divider using a D-flipflop clocked by the divided LO signal including a subtraction circuit and a voltage source at the output of the mixers.

FIGS. 11 and 12 illustrate the same embodiments as shown and described for FIGS. 4 and 8, respectively, with the addition of a subtraction circuit and voltage source at the output of the mixers. The voltage source is configured to output a fixed DC signal equal to the first DC signal and the subtraction circuit is configured to subtract the fixed DC signal from the output of the mixer.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. An apparatus for controlling the generation of a first direct current (DC) signal, the apparatus comprising:
    a mixer configured to receive a first and a second input signal, the mixer being such as to generate the first DC signal at an output of the mixer when the first and second input signals have the same frequency and a first relative phase,
    a phase detector for determining a relative phase of the first and second input signals, and
    a phase modifier configured to invert the phase of the second signal in response to a determination that the relative phase of the first and second signals is such that the output of the mixer is not the first DC signal, wherein the inversion is such that the output of the mixer is the first DC signal.

2. The apparatus of claim 1, further comprising a compensation means configured to remove the DC signal from the output of the mixer.

3. The apparatus of claim 2, wherein the compensation means comprises a subtraction circuit and a voltage source, the voltage source being configured to output a fixed DC signal equal to the first DC signal and the subtraction circuit being configured to subtract the fixed DC signal from the output of the mixer.

4. The apparatus of claim 2, wherein the compensation means is a digital to analogue converter.

5. The apparatus of claim 1, wherein the first and second signals originate from the same signal generation source.

6. The apparatus of claim 1, wherein the first and second signals are matching sub-harmonics of two signals divided from the same signal generation source.

7. The apparatus of claim 1, wherein the mixer is configured to mix a signal received by a radio receiver to an intermediate frequency, and wherein the first signal is unwanted interference resulting from a coupling of the radio receiver and the source of the second signal.

8. The apparatus of claim 1, wherein the phase detector comprises at least one detector mixer, wherein the detector mixer is configured to receive the first and second input signals and generate a second DC signal at the output of the detector mixer when the first and second input signals have the same frequency,
    wherein the phase detector determines the relative phase of the first and second signals in dependence on the second DC signal.

9. The apparatus of claim 1, wherein the phase detector comprises two detector mixers, the first detector mixer being configured to receive an I component of the second signal and the second detector mixer being configured to receive a Q component of the second signal.

10. The apparatus of claim 9, wherein the phase detector further comprises a selector configured to receive the I and Q detector mixer outputs and select the detector mixer output with the greatest signal magnitude for pass-through to a comparator.

11. The apparatus of claim 9, wherein the phase detector further comprises a comparator means configured to receive a DC voltage, the DC voltage representing the relative phase of the first and second signals, and send a first control signal to the phase modifier when the DC voltage is below a threshold and sending a second control signal to the phase modifier when the DC voltage is greater than the threshold.

12. The apparatus of claim 1, wherein the phase detector is configured to receive the first and second signals and send a control signal to the phase modifier in dependence on the determined relative phase of the first and second signals.

13. The apparatus of claim 9, wherein the phase detector is configured to send a first control signal to the phase modifier when the determined relative phase is between a first and a second boundary defining a phase region comprising the first relative phase, and wherein a second control signal is sent to the phase modifier when the determined relative phase is outside of the phase region.

14. The apparatus of claim 12, wherein the phase modifier is configured to invert the phase of the second signal in response to receiving a second control signal from the phase detector.

15. The apparatus of claim 12, wherein the phase modifier is configured to receive the second signal and an inverted second signal, wherein the inversion of the phase of the second signal is performed by passing the inverted second signal through as the second signal instead of the non-inverted second signal.

16. A method of controlling the generation of a first direct current (DC) signal at an output of a mixer, the mixer being configured to receive a first and a second input signal, the mixer being such as to generate the first DC signal at the output of the mixer when the first and second input signals have the same frequency and a first relative phase,
    the method comprising the steps of:
    determining a relative phase of the first and second input signals to the mixer, and
    modifying the phase of the second signal relative to the first signal in dependence on the determination made in the determination step by inverting the phase of the second signal in response to a determination that the relative phase is such that the output of the mixer is not the first DC signal, wherein the inversion is such that the output of the mixer is the first DC signal.

17. An apparatus for controlling compensating of a first direct current (DC) signal, the apparatus comprising:
    a mixer configured to receive a first and a second input signal, the mixer being such as to generate the first DC signal at an output of the mixer when the first and second input signals have the same frequency and a first relative phase,
    a phase detector for determining a relative phase of the first and second input signals, and
    a voltage compensating means comprising:

a voltage source configured to generate a second DC signal in dependence on the relative phase of the first and second input signals, such that the generated second DC signal compensates the first DC signal at the output of the mixer; and a subtraction circuit configured to subtract the second DC signal from the output of the mixer.

18. The apparatus of claim 17, wherein the voltage source is a digital to analogue converter.

19. The apparatus of claim 18, wherein the digital to analogue converter generates a DC signal according to a digital offset value provided to the digital to analogue converter by an offset control module.

20. The apparatus of claim 19, the offset control module comprising a lookup table, wherein the offset control module supplies a digital offset value, selected from the lookup table in dependence on the determined relative phase of the first and second input signals, to the digital to analogue converter.

21. The apparatus as claimed in claim 17 further comprising a multiplexer arranged to select one of two DC offsets in dependence on the relative phase of the first and second input signals and wherein the voltage source is configured to generate the second DC signal in dependence on the selected DC offset.

22. A method of controlling compensating of a first direct current (DC) signal at an output of a mixer, the mixer being configured to receive a first and a second input signal, the mixer being such as to generate a first DC signal at the output of the mixer when the first and second input signals have the same frequency and a first relative phase, the method comprising the steps of:

determining a relative phase of the first and second input signals to the mixer, generating a second DC signal in dependence on the relative phase of the first and second input signals, such that the generated second DC signal compensates the first DC signal at the output of the mixer, and subtracting the second DC signal from the output of the mixer.

23. The method as claimed in claim 22 further comprising: selecting one of two DC offsets in dependence on the relative phase of the first and second input signals, wherein the generating step is performed in dependence on the selected DC offset.

24. An apparatus for controlling the generation of a first direct current (DC) signal, the apparatus comprising:

a mixer configured to receive a first and a second input signal, the mixer being such as to generate the first DC signal at an output of the mixer when the first and second input signals have the same frequency and a first relative phase, a phase detector for determining a relative phase of the first and second input signals, a phase modifier configured to modify the phase of the second signal relative to the first signal in dependence on the determination of the relative phase between the first and second signals such that the output of the mixer is the first DC signal; and a compensation means comprising a subtraction circuit and a voltage source, the voltage source being configured to output a fixed DC signal equal to the first DC signal and the subtraction circuit being configured to subtract the fixed DC signal from the output of the mixer.

* * * * *